United States Patent
Yerramalli et al.

(10) Patent No.: US 11,864,234 B2
(45) Date of Patent: Jan. 2, 2024

(54) BEAM-BASED CHANNEL ACCESS PROCEDURES

(71) Applicant: QUALCOMM Incorporated, San Diego, CA (US)

(72) Inventors: Srinivas Yerramalli, San Diego, CA (US); Arumugam Chendamarai Kannan, San Diego, CA (US); Vinay Chande, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/917,472

(22) Filed: Jun. 30, 2020

(65) Prior Publication Data

US 2021/0045158 A1 Feb. 11, 2021

Related U.S. Application Data

(60) Provisional application No. 62/884,614, filed on Aug. 8, 2019.

(51) Int. Cl.
*H04W 74/08* (2009.01)
*H04L 1/00* (2006.01)
(Continued)

(52) U.S. Cl.
CPC ...... *H04W 74/0833* (2013.01); *H04B 7/0617* (2013.01); *H04L 1/0003* (2013.01); *H04L 5/0007* (2013.01); *H04L 5/0048* (2013.01); *H04W 52/362* (2013.01); *H04W 72/21* (2023.01); *H04W 72/0473* (2013.01)

(58) Field of Classification Search
CPC .......... H04W 74/0833; H04W 72/046; H04W 52/362; H04W 52/365; H04W 52/42; H04W 72/0413; H04W 72/1284; H04W 16/28; H04B 7/0617; H04B 7/0695;
(Continued)

(56) References Cited

U.S. PATENT DOCUMENTS

2004/0022177 A1* 2/2004 Awad ................. H04B 1/70755
370/204
2010/0035565 A1* 2/2010 Baker ................. H04B 7/0697
455/101

(Continued)

FOREIGN PATENT DOCUMENTS

EP 3496502 A1 6/2019
WO 2019104299 A1 5/2019

OTHER PUBLICATIONS

U.S. Appl. No. 62/841,775, filed May 1, 2019 (Year: 2019).*
(Continued)

*Primary Examiner* — Ian N Moore
*Assistant Examiner* — Sun Jong Kim
(74) *Attorney, Agent, or Firm* — Harrity & Harrity, LLP

(57) ABSTRACT

A base station (BS) or a user equipment (UE) performs a channel access procedure for a plurality of beams to determine an availability of the plurality of beams. In some implementations, the BS or the UE determines that a channel access procedure is successful for a subset of the plurality of beams. In such implementations, the BS or the UE performs the transmission on the subset of the plurality of beams.

31 Claims, 11 Drawing Sheets

(51) Int. Cl.
   *H04L 5/00*      (2006.01)
   *H04B 7/06*      (2006.01)
   *H04W 52/36*     (2009.01)
   *H04W 72/21*     (2023.01)
   *H04W 72/044*    (2023.01)

(58) Field of Classification Search
   CPC ....... H04B 7/088; H04L 1/0003; H04L 1/004; H04L 5/0007; H04L 5/0023; H04L 5/0048
   See application file for complete search history.

(56) References Cited

U.S. PATENT DOCUMENTS

| | | | | |
|---|---|---|---|---|
| 2015/0003268 A1* | 1/2015 | Wang | ................ | H04W 52/367 370/252 |
| 2017/0346611 A1* | 11/2017 | Stirling-Gallacher | ................ | H04L 5/0023 |
| 2018/0091257 A1* | 3/2018 | Steele | ................ | H04L 1/0003 |
| 2018/0091262 A1* | 3/2018 | Jung | ................ | H04L 1/1812 |
| 2018/0242232 A1* | 8/2018 | Chendamarai Kannan | ................ | H04B 7/0695 |
| 2018/0309496 A1* | 10/2018 | Lee | ................ | H04L 5/0053 |
| 2019/0068276 A1* | 2/2019 | Ravishankar | ................ | H04B 7/18584 |
| 2019/0141744 A1* | 5/2019 | Naghshvar | ................ | H04B 7/0617 |
| 2019/0208544 A1* | 7/2019 | Jia | ................ | H04W 72/10 |
| 2019/0230706 A1 | 7/2019 | Li et al. | | |
| 2019/0327695 A1* | 10/2019 | Ren | ................ | H04W 52/54 |
| 2020/0021389 A1* | 1/2020 | Guan | ................ | H04B 7/0695 |
| 2020/0145174 A1* | 5/2020 | Liang | ................ | H04W 72/0446 |
| 2020/0146063 A1* | 5/2020 | Xu | ................ | H04B 17/318 |
| 2020/0163059 A1* | 5/2020 | Zhang | ................ | H04L 25/0226 |
| 2020/0350972 A1* | 11/2020 | Yi | ................ | H04L 5/0051 |
| 2021/0235491 A1* | 7/2021 | Iyer | ................ | H04W 72/042 |
| 2021/0368452 A1* | 11/2021 | Yang | ................ | H04W 52/146 |
| 2021/0392683 A1* | 12/2021 | Awadin | ................ | H04B 7/088 |

OTHER PUBLICATIONS

U.S. Appl. No. 62/754,273, filed Nov. 1, 2018 (Year: 2018).*
International Search Report and Written Opinion—PCT/US2020/040504—ISA/EPO—dated Sep. 15, 2020.

* cited by examiner

BEAM-BASED CHANNEL ACCESS PROCEDURES

CROSS-REFERENCE TO RELATED APPLICATION

This Patent Application claims priority to U.S. Provisional Patent Application No. 62/884,614, filed on Aug. 8, 2019, entitled "BEAM-BASED LISTEN-BEFORE-TALK (LBT) PROCEDURES," and assigned to the assignee hereof. The disclosure of the prior Application is considered part of and is incorporated by reference into this Patent Application.

TECHNICAL FIELD

Aspects of the present disclosure relate generally to wireless communication, and more particularly to techniques for beam-based channel access procedures.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a base station (BS). The method may include performing a channel access procedure for a plurality of beams; determining that the channel access procedure was successful for a subset of beams of the plurality of beams; and performing a downlink transmission on the subset of beams based at least in part on determining that the channel access procedure was successful for the subset of beams.

In some aspects, when performing the downlink transmission, the method can include mapping the downlink transmission to the subset of beams in a frequency domain; mapping the downlink transmission to the subset of beams in a time domain after mapping the downlink transmission in the frequency domain; mapping the downlink transmission to the subset of beams in a spatial domain after mapping the downlink transmission in the time domain; and performing the downlink transmission on the subset of beams based at least in part on mapping the downlink transmission to the subset of beams in the frequency domain, the time domain, and the spatial domain.

In some aspects, when performing the downlink transmission, the method can include determining a transport block size for the downlink transmission based on a quantity of the plurality of beams. In some aspects, when performing the downlink transmission, the method can include determining a transport block size for the downlink transmission based on which of the plurality of beams that the channel access procedure was determined to be successful.

Another innovative aspect of the subject matter described in this disclosure can be implemented in a BS for wireless communication. The BS may include a processing system and an interface. The processing system may be configured to execute a channel access procedure for a plurality of beams and determine that the channel access procedure was successful for a subset of beams of the plurality of beams. The interface may output a downlink signal for transmission on the subset of beams based at least in part on determining that the channel access procedure was successful for the subset of beams.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to perform a channel access procedure for a plurality of beams; determine that the channel access procedure was successful for a subset of beams of the plurality of beams; and perform a downlink transmission on the subset of beams based at least in part on determining that the channel access procedure was successful for the subset of beams.

Another innovative aspect of the subject matter described in this disclosure can be implemented in an apparatus for wireless communication. The apparatus may include means for performing a channel access procedure for a plurality of beams; means for determining that the channel access procedure was successful for a subset of beams of the plurality of beams; and means for performing a downlink transmission on the subset of beams based at least in part on determining that the channel access procedure was successful for the subset of beams.

Another innovative aspect of the subject matter described in this disclosure can be implemented in a method of wireless communication performed by a BS. The method may include performing a channel access procedure for a plurality of beams; determining that the channel access procedure was successful for a subset of beams of the plurality of beams; and performing a downlink transmission on the plurality of beams after determining that the channel access procedure for the plurality of beams is successful.

Another innovative aspect of the subject matter described in this disclosure can be implemented in a BS for wireless communication. The BS may include a processing system and an interface. The processing system may be configured to execute a channel access procedure for a plurality of beams and determine that the channel access procedure was successful for a subset of beams of the plurality of beams. The interface may output a downlink signal for transmission on the plurality of beams after determining that the channel access procedure for the plurality of beams is successful.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to perform a channel access procedure for a plurality of beams; determine that the channel access procedure was successful for a subset of beams of the plurality of beams; and performing a downlink transmission on the plurality of beams after determining that the channel access procedure for the plurality of beams is successful.

Another innovative aspect of the subject matter described in this disclosure can be implemented in an apparatus for wireless communication. The apparatus may include means for performing a channel access procedure for a plurality of beams; means for determining that the channel access procedure was successful for a subset of beams of the plurality of beams; and means for performing a downlink transmission on the plurality of beams after determining that the channel access procedure for the plurality of beams is successful.

Another innovative aspect of the subject matter described in this disclosure can be implemented in a method of wireless communication performed by a user equipment (UE). The method may include performing a channel access procedure for a plurality of beams; determining that the channel access procedure was successful for a subset of beams of the plurality of beams; and performing an uplink transmission on the subset of beams based at least in part on determining that the channel access procedure was successful for the subset of beams.

In some aspects, when performing the uplink transmission, the method can include mapping the uplink transmission to the subset of beams in a frequency domain; mapping the uplink transmission to the subset of beams in a time domain after mapping the uplink transmission in the frequency domain; mapping the uplink transmission to the subset of beams in a spatial domain after mapping the uplink transmission in the time domain; and performing the uplink transmission on the subset of beams based at least in part on mapping the uplink transmission to the subset of beams in the frequency domain, the time domain, and the spatial domain.

In some aspects, when performing the uplink transmission, the method can include determining a transport block size for the uplink transmission based on a quantity of the plurality of beams. In some aspects, when performing the uplink transmission, the method can include determining a transport block size for the uplink transmission based on which of the plurality of beams that the channel access procedure was determined to be successful.

In some aspects, the method can include transmitting, to a BS, an indication of the subset of beams; receiving, from the BS and based at least in part on transmitting the indication of the subset of beams, a retransmission request to retransmit the uplink transmission on another subset of beams of the plurality of beams; and performing, based at least in part on receiving the retransmission request, a retransmission of the uplink transmission on the other subset of beams.

In some aspects, when transmitting the indication of the subset of beams, the method can include reallocating transmit power from another subset of beams, of the plurality of beams, to the subset of beams; and performing the uplink transmission based at least in part on transmit power of the subset of beams and the transmit power reallocated from the other subset of beams to the subset of beams.

In some aspects, when performing the uplink transmission, the method can include adjusting modulation of the uplink transmission based at least in part on reallocating the transmit power from the other subset of beams to the subset of beams, or adjusting channel coding of the uplink transmission based at least in part on reallocating the transmit power from the other subset of beams to the subset of beams.

In some aspects, the method can include transmitting an indication of at least one of the adjusted modulation, the adjusted channel coding, or a power headroom report that is based at least in part on the transmit power of the subset of beams and the transmit power reallocated from the other subset of beams to the subset of beams.

In some aspects, the method can include adjusting a sounding reference signal transmission order on the plurality of beams based at least in part on determining that the respective channel access procedures were not successful.

Another innovative aspect of the subject matter described in this disclosure can be implemented in a UE for wireless communication. The UE may include a processing system and an interface. The processing system may be configured to execute a channel access procedure for a plurality of beams and determine that the channel access procedure was successful for a subset of beams of the plurality of beams. The interface may be configured to output an uplink signal for transmission on the subset of beams based at least in part on determining that the channel access procedure was successful for the subset of beams.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to perform a channel access procedure for a plurality of beams; determine that the channel access procedure was successful for a subset of beams of the plurality of beams; and perform an uplink transmission on the subset of beams based at least in part on determining that the channel access procedure was successful for the subset of beams.

Another innovative aspect of the subject matter described in this disclosure can be implemented in an apparatus for wireless communication. The apparatus may include means for performing a channel access procedure for a plurality of beams; means for determining that the channel access procedure was successful for a subset of beams of the plurality of beams; and means for performing an uplink transmission on the subset of beams based at least in part on determining that the channel access procedure was successful for the subset of beams.

Another innovative aspect of the subject matter described in this disclosure can be implemented in a method of wireless communication performed by a UE. The method may include performing a channel access procedure for a plurality of beams; determining that the channel access procedure was successful for a subset of beams of the plurality of beams; and performing an uplink transmission on the plurality of beams after determining that the channel access procedure for the plurality of beams is successful.

Another innovative aspect of the subject matter described in this disclosure can be implemented in a UE for wireless communication. The UE may include a processing system and an interface. The processing system may be configured to execute a channel access procedure for a plurality of beams and determine that the channel access procedure was successful for a subset of beams of the plurality of beams. The interface may output an uplink signal for transmission on the plurality of beams after determining that the channel access procedure for the plurality of beams is successful.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to perform a channel access procedure for a plurality of beams; determine that the channel access procedure was successful for a subset of beams of the plurality of beams; and perform an uplink transmission on the plurality of beams after determining that the channel access procedure for the plurality of beams is successful.

Another innovative aspect of the subject matter described in this disclosure can be implemented in an apparatus for wireless communication. The apparatus may include means for performing a channel access procedure for a plurality of beams; means for determining that the channel access procedure was successful for a subset of beams of the plurality of beams; and means for performing an uplink transmission on the plurality of beams after determining that the channel access procedure for the plurality of beams is successful.

Another innovative aspect of the subject matter described in this disclosure can be implemented in a method of wireless communication performed by a wireless communication device. The method may include performing a first channel access procedure for a plurality of beams. The method may include determining that the first channel access procedure was successful for a first subset of beams of the plurality of beams. The method may include perform a second channel access procedure for the plurality of beams based at least in part on determining that the first channel access procedure was successful for the first subset of beams. The method may include determining that the second channel access procedure was successful for a second subset of beams of the plurality of beams. The method may include performing a transmission on at least one of the first subset of beams or the second subset of beams based at least in part on determining that the second channel access procedure was successful for the second subset of beams.

Another innovative aspect of the subject matter described in this disclosure can be implemented in a wireless communication device for wireless communication. The wireless communication device may include a processing system and an interface. The processing system may be configured to execute a first channel access procedure for a plurality of beams. The processing system may be configured to determine that the first channel access procedure was successful for a first subset of beams of the plurality of beams. The processing system may be configured to execute a second channel access procedure for the plurality of beams based at least in part on determining that the first channel access procedure was successful for the first subset of beams. The processing system may be configured to determine that the second channel access procedure was successful for a second subset of beams of the plurality of beams. The interface may be configured to output a signal for transmission on at least one of the first subset of beams or the second subset of beams based at least in part on determining that the second channel access procedure was successful for the second subset of beams.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless communication device, may cause the one or more processors to perform a first channel access procedure for a plurality of beams. The one or more instructions, when executed by one or more processors of a wireless communication device, may cause the one or more processors to determine that the first channel access procedure was successful for a first subset of beams of the plurality of beams. The one or more instructions, when executed by one or more processors of a wireless communication device, may cause the one or more processors to perform a second channel access procedure for the plurality of beams based at least in part on determining that the first channel access procedure was successful for the first subset of beams. The one or more instructions, when executed by one or more processors of a wireless communication device, may cause the one or more processors to determine that the second channel access procedure was successful for a second subset of beams of the plurality of beams. The one or more instructions, when executed by one or more processors of a wireless communication device, may cause the one or more processors to perform a transmission on at least one of the first subset of beams or the second subset of beams based at least in part on determining that the second channel access procedure was successful for the second subset of beams.

Another innovative aspect of the subject matter described in this disclosure can be implemented in an apparatus for wireless communication. The apparatus may include means for performing a first channel access procedure for a plurality of beams. The apparatus may include determining that the first channel access procedure was successful for a first subset of beams of the plurality of beams. The apparatus may include means for perform a second channel access procedure for the plurality of beams based at least in part on determining that the first channel access procedure was successful for the first subset of beams. The apparatus may include means for determining that the second channel access procedure was successful for a second subset of beams of the plurality of beams. The apparatus may include means for performing a transmission on at least one of the first subset of beams or the second subset of beams based at least in part on determining that the second channel access procedure was successful for the second subset of beams.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
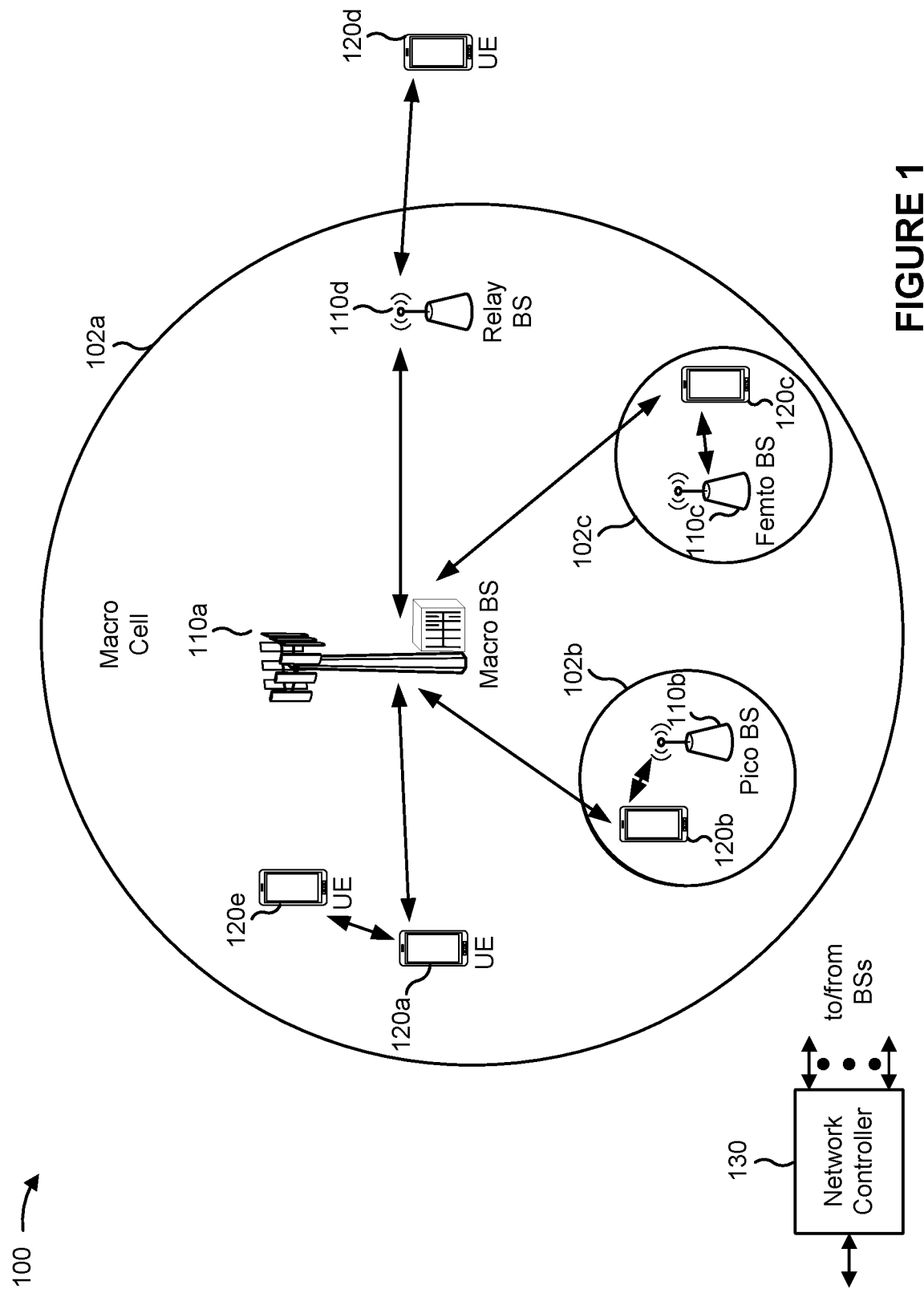
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In a wireless communication system, such as a 5G (NR) system, spectral sharing can be used (for example, in a millimeter wave (mmW) band), meaning that transmissions can be communicated in different spatial directions on the same band in relatively narrow beams. For example, a base station (BS) or a user equipment (UE) may be scheduled to perform a transmission on a plurality of narrow beams.

In association with performing such beam-based directional transmissions, a channel access procedure, associated with determining channel availability, may be used to determine availability of a transmit beam to be used for a given transmission. For example, a base station or a user equipment may perform a channel access procedure for a plurality of beams on which the base station or the user equipment is to perform a transmission in order to determine whether each of the plurality of beams is available for the transmission. However, the base station or the user equipment may determine that a channel access procedure is successful for a subset of the plurality of beams. In this case, the base station or the user equipment may be unable to determine whether to proceed with performing the transmission on the plurality of beams or to drop the transmission altogether.

Particular implementations of the subject matter described in this disclosure can be implemented to realize one or more of the following potential advantages. In some aspects, the techniques and apparatuses described herein provide beam-based channel access procedures that may permit a base station or a user equipment to perform a transmission on a subset of a plurality of beams for which a channel access procedure is determined to be successful, or may permit the base station or the user equipment to perform the transmission after the base station or the user equipment determines that the channel access procedure is successful for the plurality of beams. The techniques and apparatuses described herein may decrease the likelihood that a transmission will be dropped or undecodable at a receiver as a result of a channel access procedure being successful for a subset of a plurality of beams on which the transmission is to be performed.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
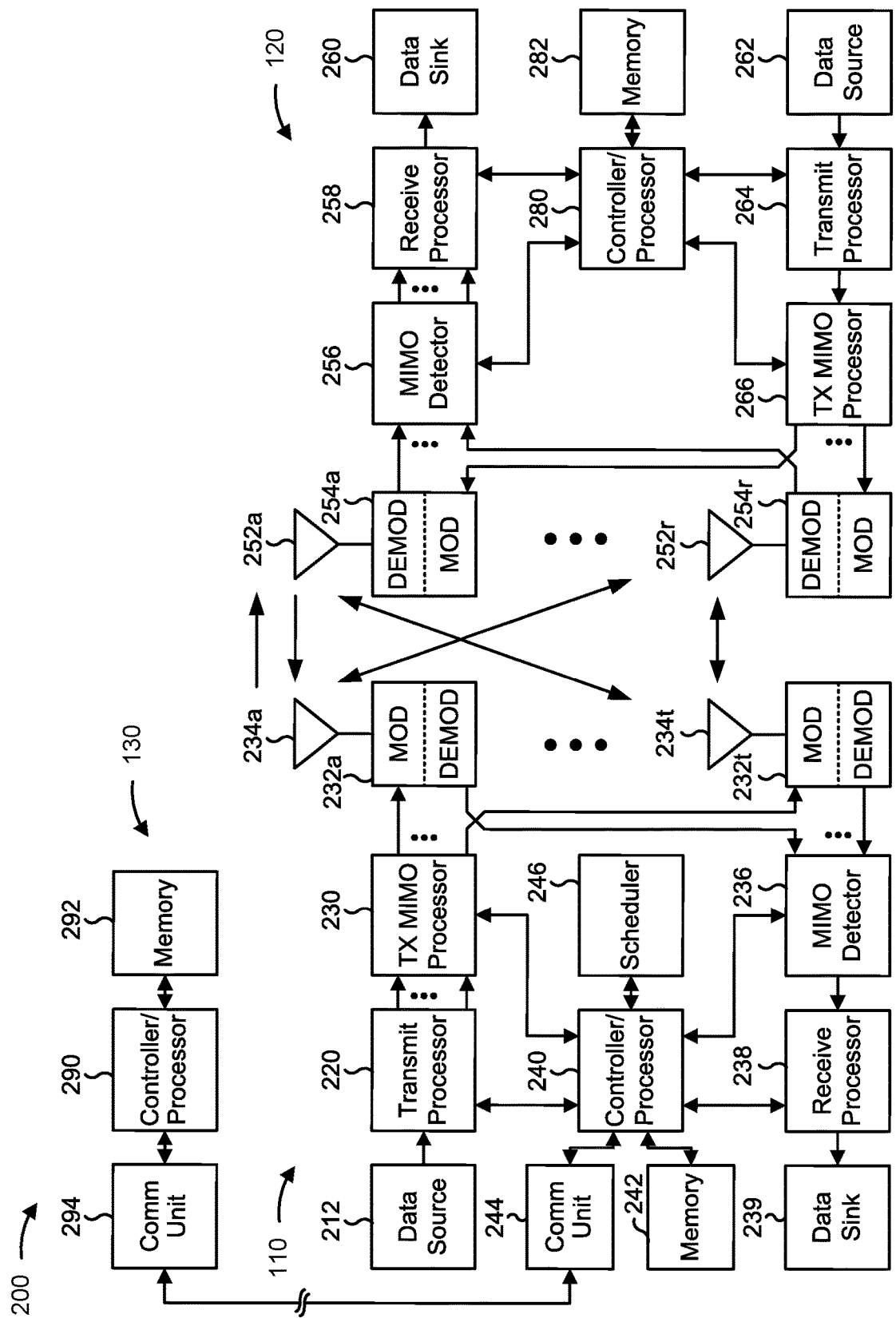
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to receive or obtain information, and a second interface configured to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to receive or obtain information, and a second interface configured to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with beam-based channel access procedures, as described in more detail elsewhere herein. For example, the controller/processor 240 of base station 110, the controller/processor 280 of UE 120, or any other component(s) (or combinations of components) of FIG. 2 may perform or direct operations of, for example, the process 700 of FIG. 7, the process 800 of FIG. 8, the process 900 of FIG. 9, the process 1000 of FIG. 10, or other processes as described herein. The memories 242 and 282 may store data and program codes for the base station 110 and the UE 120, respectively. A scheduler 246 may schedule UEs for data transmission on the downlink, the uplink, or a combination thereof.

Figure 7:
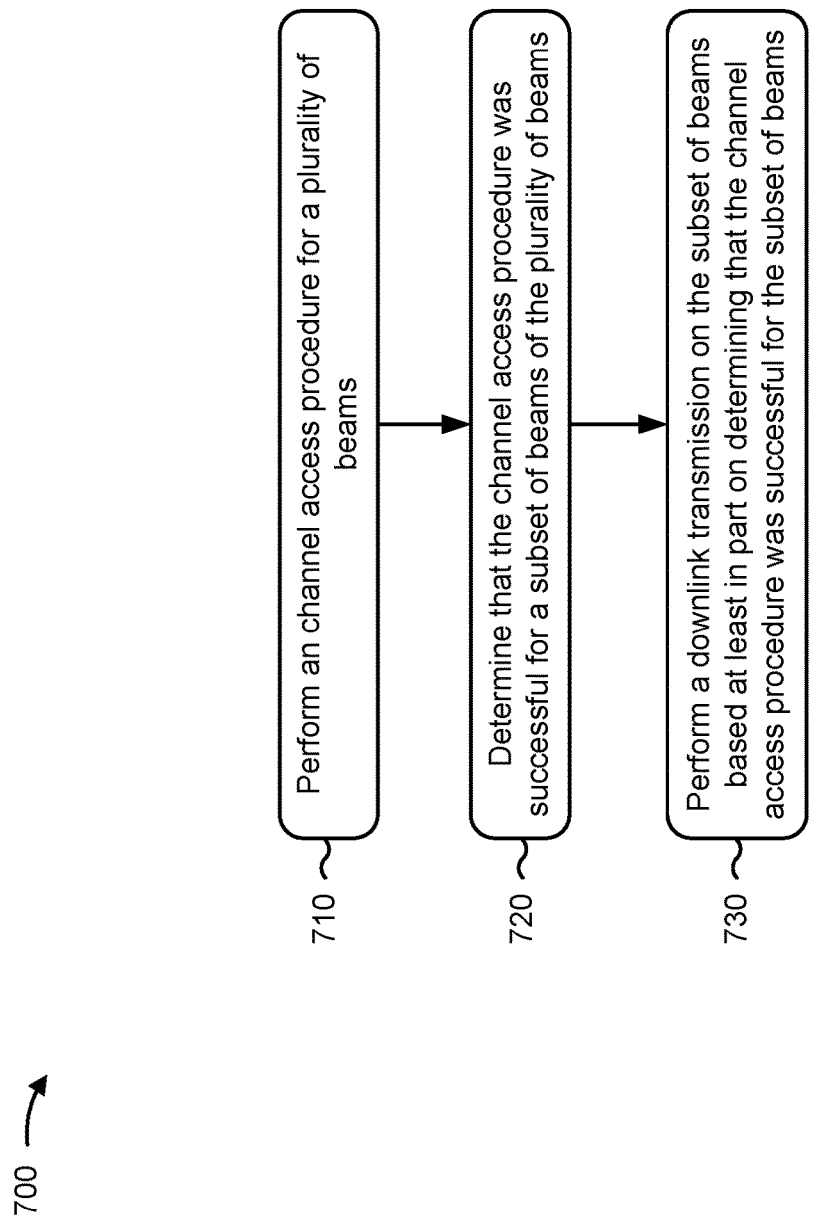
FIGS. 7 and 8 are diagrams illustrating example processes performed, for example, by a BS.
Figure 8:
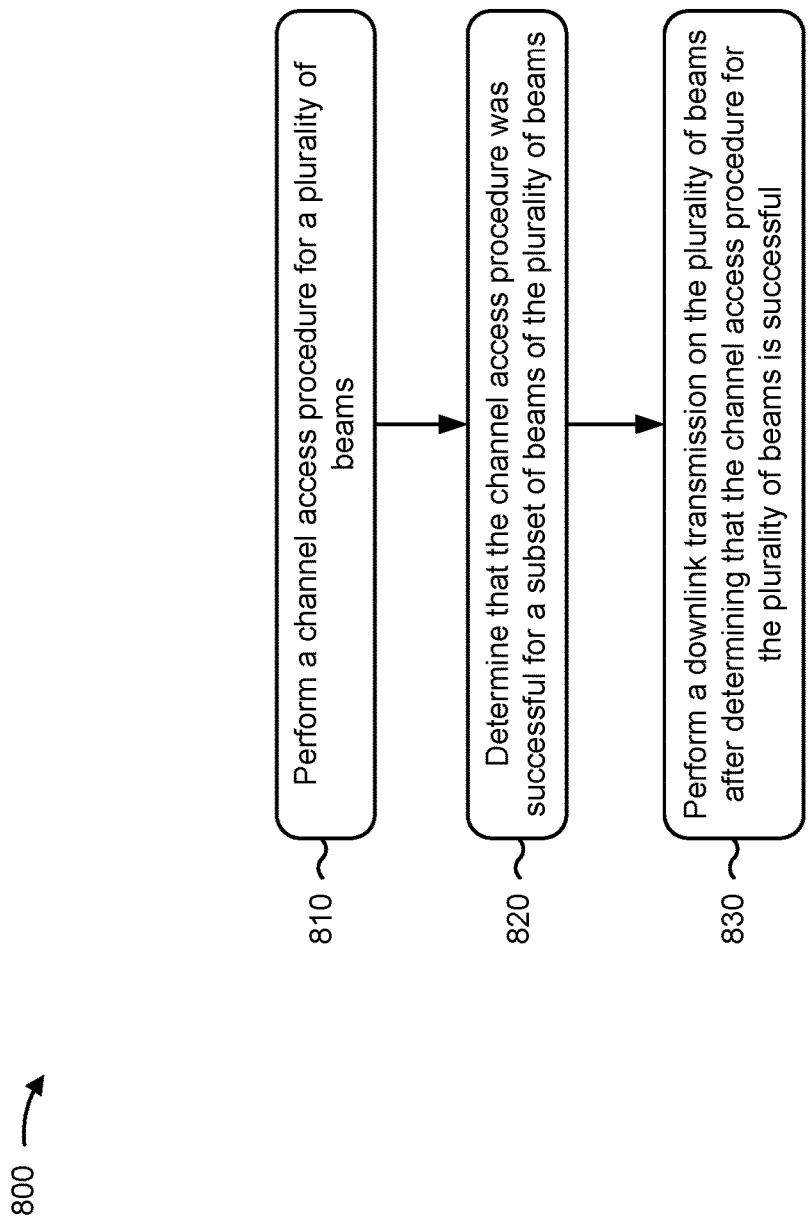

The stored program codes, when executed by the controller/processor 240 or other processors and modules at the base station 110, may cause the base station 110 to perform operations described with respect to the process 700 of FIG. 7, the process 800 of FIG. 8, or other processes as described herein. A scheduler 246 may schedule UEs for data transmission on the downlink, the uplink, or a combination thereof.

The base station 110 may include means for performing one or more operations described herein, such as the process 700 of FIG. 7, the process 800 of FIG. 8, or other processes as described herein. In some aspects, such means may include one or more components of the base station 110 described in connection with FIG. 2.

Figure 9:
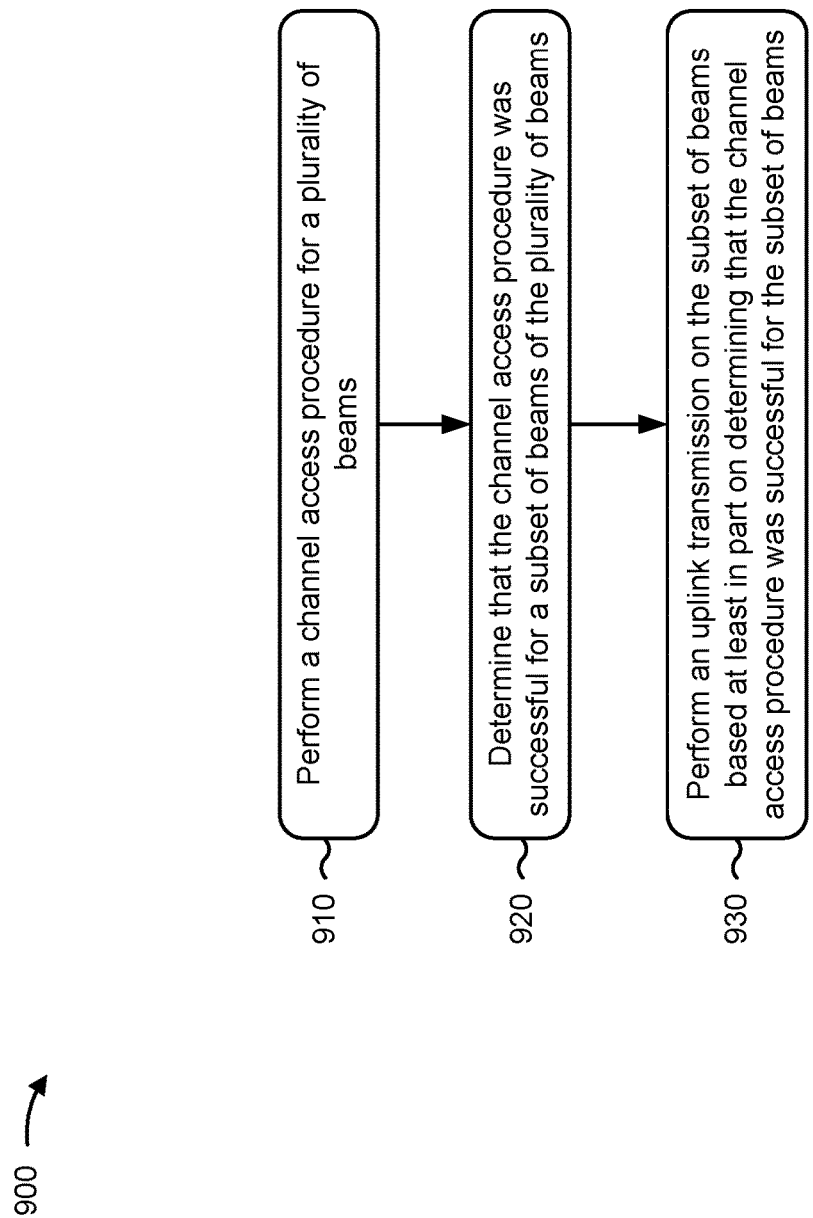
FIGS. 9 and 10 are diagrams illustrating example processes performed, for example, by a UE.
Figure 10:
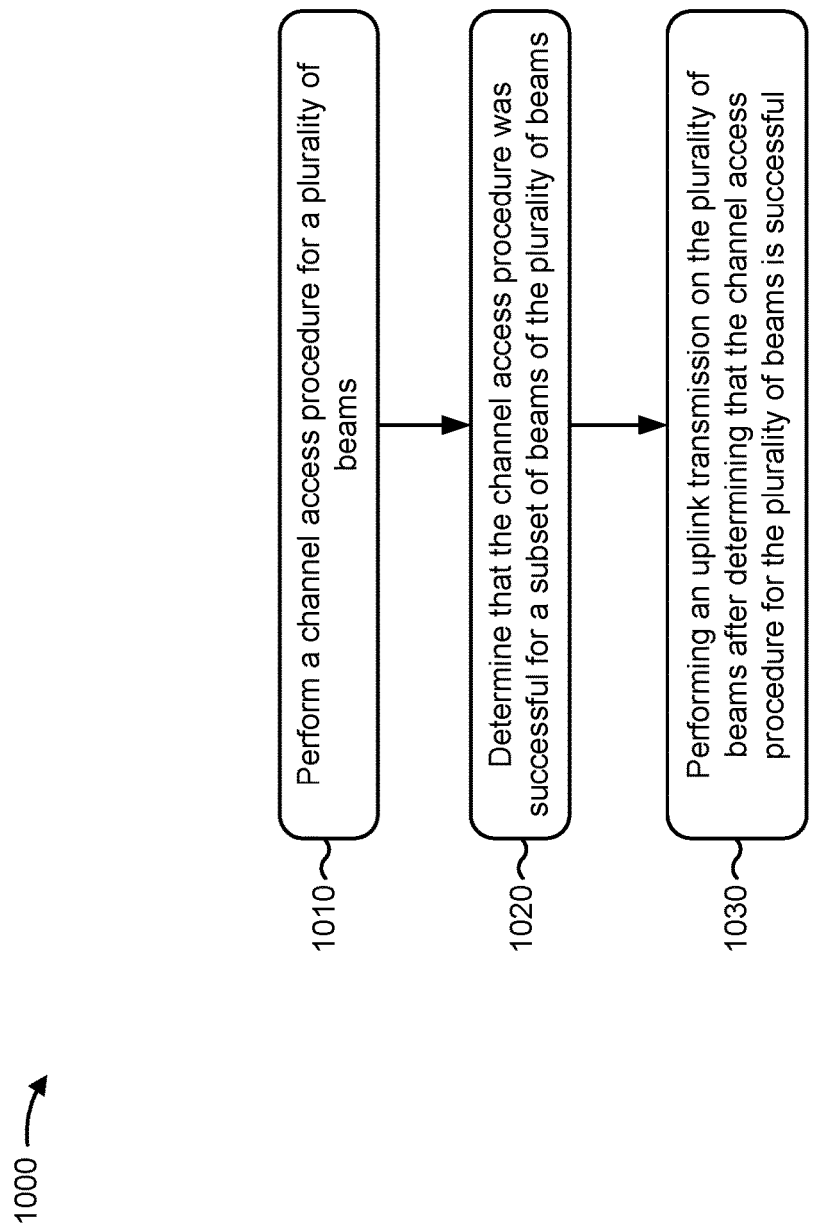

The stored program codes, when executed by the controller/processor 280 or other processors and modules at the UE 120, may cause the UE 120 to perform operations described with respect to the process 900 of FIG. 9, the process 1000 of FIG. 10, or other processes as described herein.

The UE 120 may include means for performing one or more operations described herein, such as the process 900 of FIG. 9, the process 1000 of FIG. 10, or other processes as described herein. In some aspects, such means may include one or more components of the UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

FIGS. 3-6 are diagrams illustrating examples associated with beam-based channel access procedures.

Figure 3:
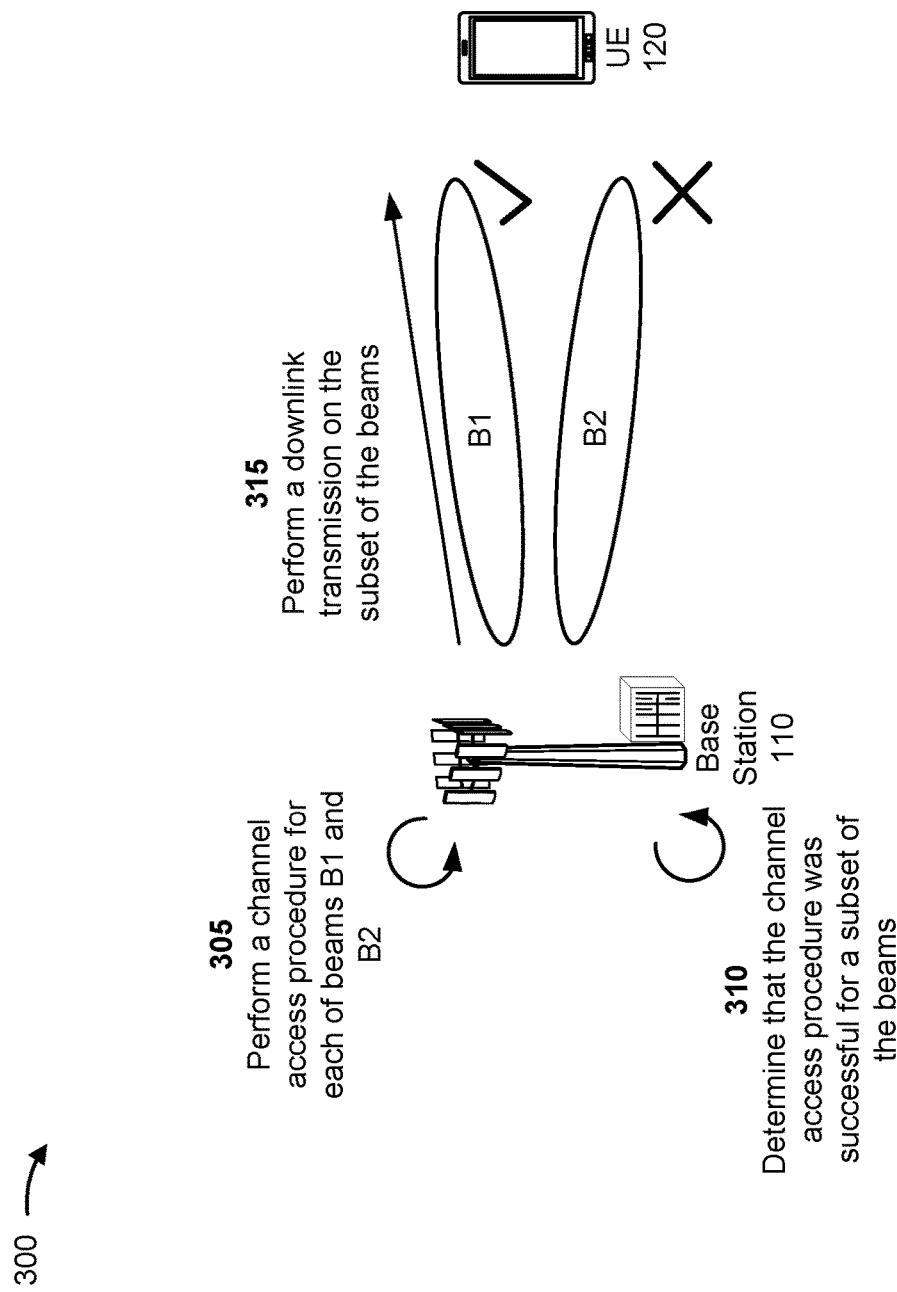
FIGS. 3-6 are diagrams illustrating examples associated with beam-based channel access procedures.

FIG. 3 is a diagram illustrating an example 300 in which a base station 110 and a UE 120 perform techniques associated with beam-based channel access procedures for a plurality of beams (for example, beams B1 and B2) on which the base station 110 is scheduled to perform a downlink transmission to the UE 120. In some aspects, the base station 110 may be scheduled to perform the downlink transmission by dynamic scheduling (for example, downlink control information (DCI) scheduling), by semi-persistent scheduling (for example, radio resource control (RRC) scheduling or medium access control (MAC) control element (MAC-CE) scheduling), cross-transmission opportunity (cross-TxOP) scheduling, or other forms of downlink scheduling.

In some aspects, the base station 110 may perform techniques associated with beam-based channel access procedures, described in connection with FIG. 3, for a greater quantity of beams, for a greater quantity of UEs 120, or for a different configuration of beams. As an example, while FIG. 3 illustrates the base station 110 being scheduled to perform a downlink transmission to a UE 120 on two beams, the base station 110 may be scheduled to perform the downlink transmission to a UE 120 on a greater quantity of beams, may be scheduled to perform the downlink transmission to a greater quantity of UEs 120, or may be scheduled to perform the downlink transmission to a greater quantity of UEs 120 and on a greater quantity of beams. Moreover, a greater quantity of base stations 110 may perform the techniques associated with beam-based channel procedures described in connection with FIG. 3. For example, a plurality of base stations 110 may be scheduled to perform downlink transmissions on respective beams to UE 120, which may be referred to as a multi-transmit receive point (multi-TRP) transmission.

As shown by reference number 305 in FIG. 3, in some aspects, the base station 110 may perform a channel procedure for each of the beams B1 and B2 prior to performing the downlink transmission. The base station 110 may perform a channel procedure for a beam to determine whether the beam is available to be used for the downlink transmission. A listen-before-talk (or listen-before-transmit) (LBT) procedure is an example of a channel access procedure.

In some aspects, the base station 110 may perform a channel access procedure for a beam by sensing the downlink channel (for example, a physical downlink shared channel (PDSCH) or a physical downlink control channel (PDCCH)), on which the base station 110 is to perform the downlink transmission, in the spatial direction of the beam. In this case, if the base station 110 determines that the downlink channel is busy or in use in the spatial direction of the beam, the base station 110 may determine that the channel access procedure for the beam is unsuccessful or failed. Conversely, if the base station 110 determines that the downlink channel is idle or not in use in the spatial direction of the beam, the base station 110 may determine that the channel access procedure for the beam is successful.

As shown by reference number 310, the base station 110 may determine that the channel access procedure was successful for a subset of the beams B1 and B2 and may determine that the channel access procedure failed for another subset of the beams B1 and B2. For example, the base station 110 may determine that the channel access procedure was successful for the beam B1, and may determine that the channel access procedure failed for the beam B2.

As described above, the base station 110 may determine that the channel access procedure was successful for the beam B1 based at least in part on determining that the downlink channel, on which the base station 110 is to perform the downlink transmission, is idle or not in use in the spatial direction of the beam B1. Moreover, the base station 110 may determine that the channel access procedure failed for the beam B2 based at least in part on determining that the downlink channel, on which the base station 110 is to perform the downlink transmission, is busy or in use in the spatial direction of the beam B2.

As shown by reference number 315, the base station 110 may perform the downlink transmission on the beam B1 for which the base station 110 determined that the channel access procedure was successful. This permits the base station 110 to perform the downlink transmission for at least a subset of the beams B1 and B2 as opposed to dropping the entire downlink transmission.

In some aspects, the base station 110 may perform the downlink transmission on a subset of the beams B1 and B2 without modifying the downlink grant in PDCCH for the downlink transmission. In this case, the UE 120 may be unaware that the base station 110 performed the downlink transmission on a subset of the beams B1 and B2 because the UE 120 did not receive an updated downlink grant.

In some aspects, the UE 120 may determine that the base station 110 performed the downlink transmission on a subset of the beams B1 and B2 based at least in part on detecting demodulation reference signals (DMRSs) transmitted from the base station 110. For example, the base station 110 may transmit a DMRS for each beam on which the base station 110 performs the downlink transmission, to facilitate demodulation and decoding of the downlink transmission at the UE 120. Here, the base station 110 may transmit a DMRS on the beam B1 and not on the beam B2 because the base station 110 is to perform the downlink transmission on beam B1 and is to refrain from performing the downlink transmission on the beam B2.

The UE 120 may detect the DMRS on the beam B1, may determine that a DMRS is not detected on the beam B2, and therefore may determine that the base station 110 did not perform the downlink transmission on the beam B2. Accordingly, the UE 120 may receive the downlink transmission on the beam B1 and may demodulate and decode the downlink transmission based at least in part on determining that the base station 110 performed the downlink transmission on the beam B1 and not on the beam B2.

In some aspects, performing the downlink transmission on the subset of the beams B1 and B2 may cause demodulation or decoding difficulties at the UE 120. For example, the base station 110 may perform a channel transport process for the downlink transmission under the assumption that the downlink transmission will be performed on the beams B1 and B2. In this case, the base station 110 may channel code the systematic bits (which may include data bits and CRC bits) of the downlink transmission to add parity bits to the systematic bits, may rate match the systematic bits and parity bits (which may include bit selection, bit puncturing, the addition of padding bits, and bit interleaving), or may perform other channel transport processing techniques. The base station 110 may map the channel coded and rate matched bits of the downlink transmission to the beams B1 and B2 in the spatial domain, the frequency domain, and the time domain.

However, if the base station 110 performs the downlink transmission on the beam B1 and not the beam B2, the mapping order described above may cause the downlink transmission on the beam B1 to include an insufficient quantity of systematic bits for the UE 120 to perform error correction in order to recover the systematic bits that were to be transmitted on the beam B2. Accordingly, in some aspects, the base station 110 may modify the mapping order for the channel coded and rate matched bits of the downlink transmission based at least in part on determining to perform the downlink transmission on the beam B1 and not on the beam B2. In this case, the base station 110 may map the channel coded and rate matched bits of the downlink transmission in the frequency domain first, the time domain second, and the spatial domain third. This permits the base station 110 to map a greater quantity of systematic bits to the beam B1, which permits the UE 120 to recover a greater quantity of systematic bits of the downlink transmission.

Moreover, during the channel transport process, the base station 110 may determine a transport block size for the downlink transmission based at least in part on which of the beams B1 and B2 the channel access procedure was determined to be successful (for example, the beam), based at least in part on a quantity of the beams for which the channel access procedure was determined to be successful, or other parameters associated with the channel access procedure of the beams B1 and B2.

In some aspects, the base station 110 may subsequently perform the remaining portion of the downlink transmission (for example, the portion of the downlink transmission that was scheduled to be performed on the beam B2) on the beam B2 once the base station 110 determines that the channel access procedure for the beam B2 is successful. In some aspects, the base station 110 may schedule a retransmission of the remaining portion of the downlink transmission, and may transmit an indication of the scheduled retransmission to the UE 120.

Figure 4:
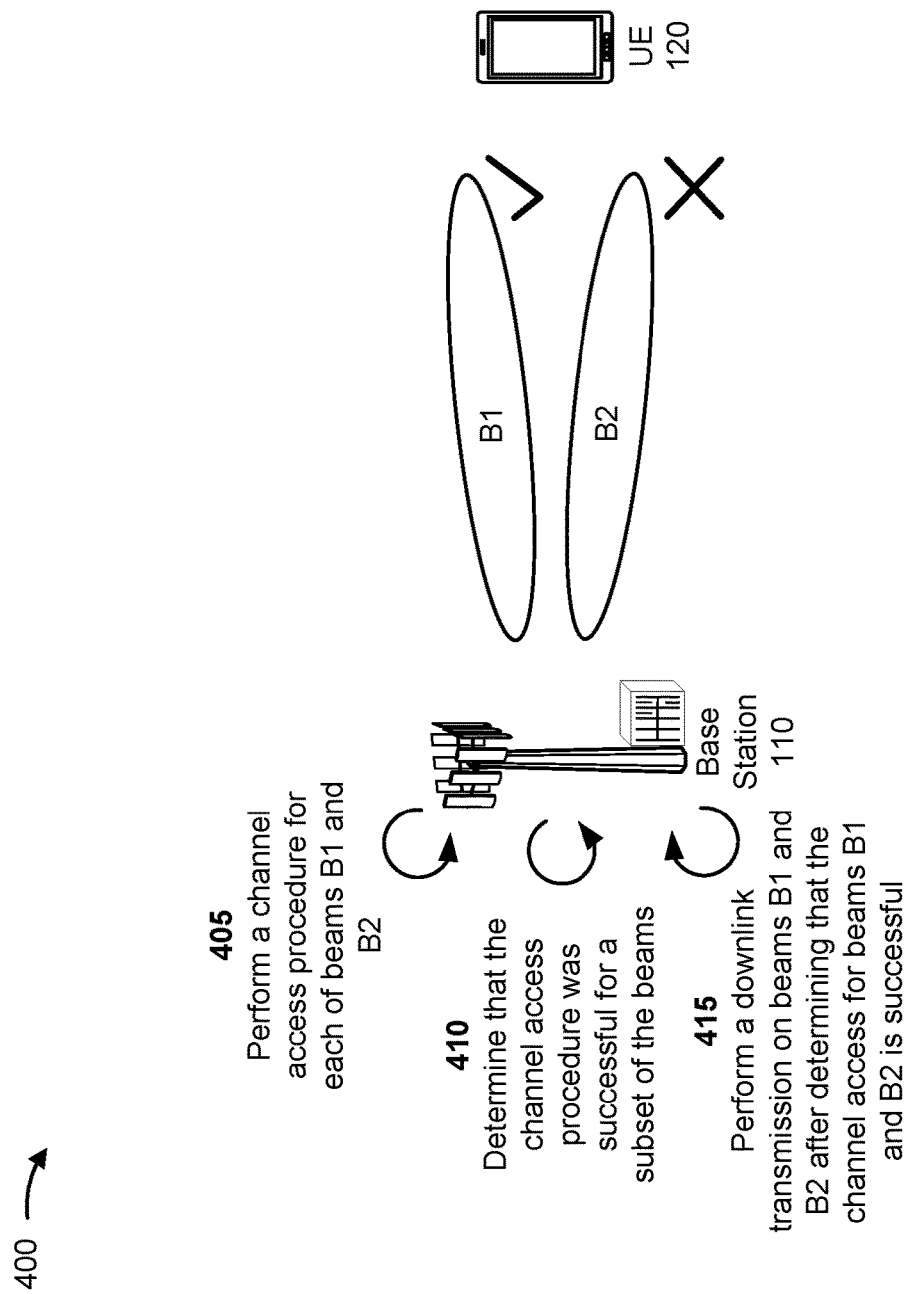

FIG. 4 is a diagram illustrating an example 300 in which a base station 110 and a UE 120 perform techniques associated with beam-based channel access procedures for a plurality of beams (for example, beams B1 and B2) on which the base station 110 is scheduled to perform a downlink transmission to the UE 120. In some aspects, the base station 110 may be scheduled to perform the downlink transmission by dynamic scheduling (for example, DCI scheduling), by semi-persistent scheduling (for example, RRC scheduling or MAC-CE scheduling), cross-TxOP scheduling, or other forms of downlink scheduling.

In some aspects, the base station 110 may perform techniques associated with beam-based channel access procedures, described in connection with FIG. 4, for a greater quantity of beams, for a greater quantity of UEs 120, or for a different configuration of beams. As an example, while FIG. 4 illustrates the base station 110 being scheduled to perform a downlink transmission to a UE 120 on two beams, the base station 110 may be scheduled to perform the downlink transmission to a UE 120 on a greater quantity of beams, may be scheduled to perform the downlink transmission to a greater quantity of UEs 120, or may be scheduled to perform the downlink transmission to a greater quantity of UEs 120 and on a greater quantity of beams. Moreover, a greater quantity of base stations 110 may perform the techniques associated with beam-based channel access procedures described in connection with FIG. 4. For example, a plurality of base stations 110 may be scheduled to perform downlink transmissions on respective beams to UE 120.

As shown by reference number 405 in FIG. 4, in some aspects, the base station 110 may perform a channel access procedure for each of the beams B1 and B2 prior to performing the downlink transmission. The base station 110 may perform a channel access procedure for a beam to determine whether the beam is available to be used for the downlink transmission.

In some aspects, the base station 110 may perform a channel access procedure for a beam by sensing the downlink channel (for example, a PDSCH or PDCCH) on which the base station 110 is to perform the downlink transmission, in the spatial direction of the beam. In this case, if the base station 110 determines that the downlink channel is busy or in use in the spatial direction of the beam, the base station 110 may determine that the channel access procedure for the beam is unsuccessful or failed. Conversely, if the base station 110 determines that the downlink channel is idle or not in use in the spatial direction of the beam, the base station 110 may determine that the channel access procedure for the beam is successful.

As shown by reference number 410, the base station 110 may determine that the channel access procedure was successful for a subset of the beams B1 and B2, and may determine that the channel access procedure failed for another subset of the beams B1 and B2. For example, base station 110 may determine that the channel access procedure was successful for the beam B1, and may determine that the channel access procedure failed for the beam B2.

The base station 110 may determine that the channel access procedure was successful for the beam B1 based at least in part on determining that the downlink channel, on which the base station 110 is to perform the downlink transmission, is idle or not in use in the spatial direction of the beam B1. Moreover, the base station 110 may determine that the channel access procedure failed for the beam B2 based at least in part on determining that the downlink channel, on which the base station 110 is to perform the downlink transmission, is busy or in use in the spatial direction of the beam B2.

As shown by reference number 415, the base station 110 may perform the downlink transmission on the beams B1 and B2 after the base station 110 determines that the channel access procedure for all of the beams B1 and B2 is successful. In this case, the base station 110 may determine to refrain from performing the downlink transmission on the beams B1 and B2 and may delay the downlink transmission until the base station 110 determines that the channel access procedure for all of the beams B1 and B2 is successful. In some aspects, the base station 110 may schedule a retransmission of the downlink transmission, and may transmit an indication of the scheduled retransmission to the UE 120.

Figure 5:
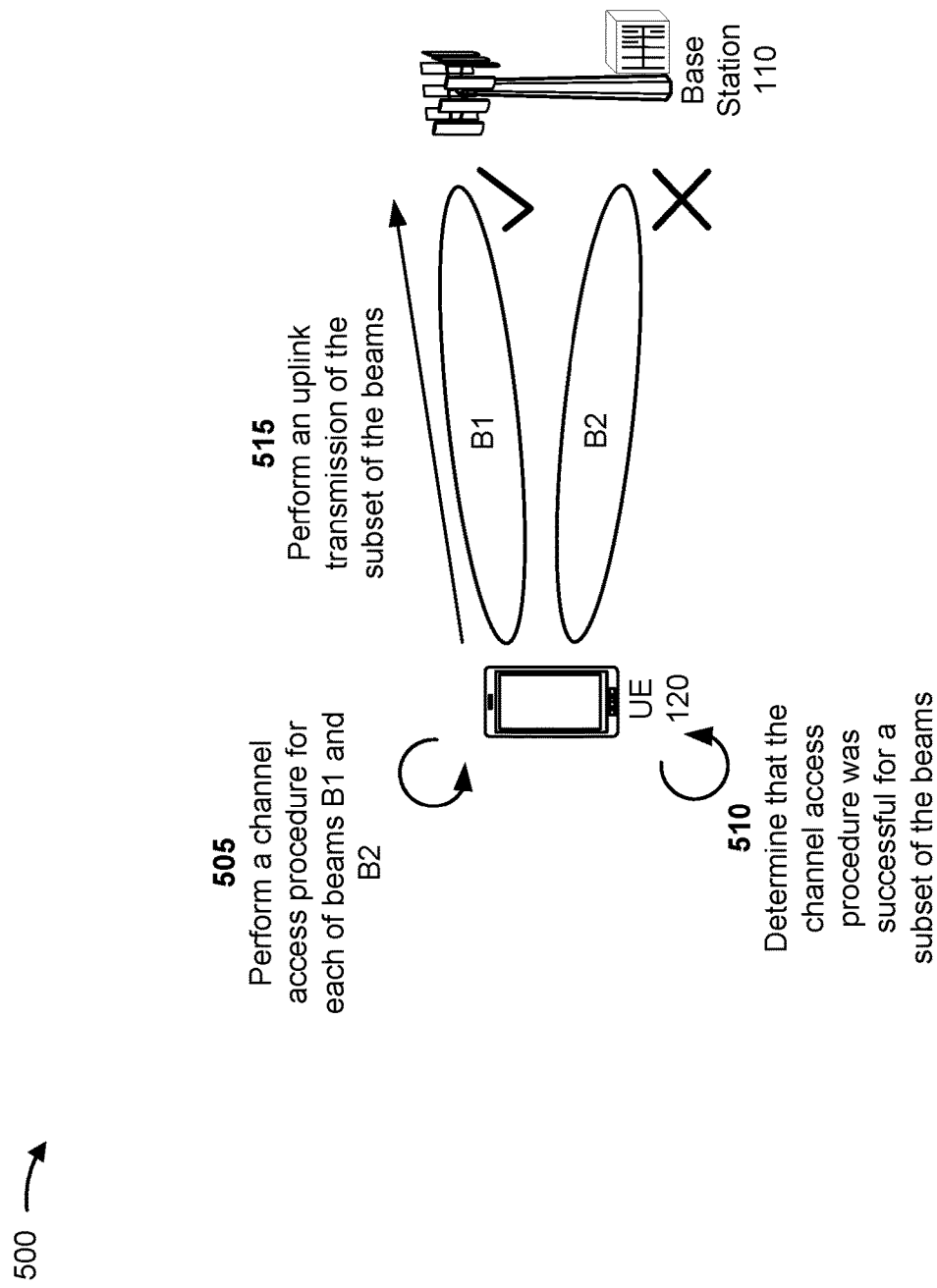

FIG. 5 is a diagram illustrating an example 500 in which a base station 110 and a UE 120 perform techniques associated with beam-based channel access procedures for a plurality of beams (for example, beams B1 and B2) on which the UE 120 is scheduled to perform an uplink transmission to the base station 110. In some aspects, the UE 120 may be scheduled to perform the uplink transmission by dynamic scheduling (for example, DCI scheduling), by a configured grant (for example, RRC scheduling or MAC-CE scheduling), cross-TxOP scheduling, or other forms of uplink scheduling.

In some aspects, the UE 120 may perform techniques associated with beam-based channel access procedures, described in connection with FIG. 5, for a greater quantity of beams, for a greater quantity of base stations 110, or for a different configuration of beams. As an example, while FIG. 5 illustrates the UE 120 being scheduled to perform an uplink transmission to base station 110 on two beams, UE 120 may be scheduled to perform the uplink transmission to a base station 110 on a greater quantity of beams, may be scheduled to perform the uplink transmission to a greater quantity of base stations 110 (a multi-TRP transmission), or may be scheduled to perform the uplink transmission to a greater quantity of base stations 110 and on a greater quantity of beams.

As shown by reference number 505 in FIG. 5, in some aspects, the UE 120 may perform a channel access procedure for each of the beams B1 and B2 prior to performing the uplink transmission. The UE 120 may perform a channel access procedure for a beam in order to determine whether the beam is available to be used for the uplink transmission.

In some aspects, the UE 120 may perform a channel access procedure for a beam by sensing the uplink channel (for example, a physical uplink shared channel (PUSCH)) or a physical uplink control channel (PUCCH)), on which the UE 120 is to perform the uplink transmission, in the spatial direction of the beam. In this case, if the UE 120 determines that the uplink channel is busy or in use in the spatial direction of the beam, the UE 120 may determine that the channel access procedure for the beam is unsuccessful or failed. Conversely, if the UE 120 determines that the uplink channel is idle or not in use in the spatial direction of the beam, the UE 120 may determine that the channel access procedure for the beam is successful.

As shown by reference number 510, the UE 120 may determine that the channel access procedure was successful for a subset of the beams B1 and B2, and may determine that the channel access procedure failed for another subset of the beams B1 and B2. For example, UE 120 may determine that the channel access procedure was successful for beam B1, and may determine that the channel access procedure failed for beam B2.

The UE 120 may determine that the channel access procedure was successful for the beam B1 based at least in part on determining that the uplink channel, on which the UE 120 is to perform the uplink transmission, is idle or not in use in the spatial direction of the beam B1. Moreover, the UE 120 may determine that the channel access procedure failed for the beam B2 based at least in part on determining that the uplink channel, on which the UE 120 is to perform the uplink transmission, is busy or in use in the spatial direction of the beam B2.

As shown by reference number 515, the UE 120 may perform the downlink transmission on the beam B1 for which the UE 120 determined that the channel access procedure was successful. This permits the UE 120 to perform the uplink transmission for at least a subset of the beams B1 and B2, as opposed to dropping the entire uplink transmission.

In some aspects, the UE 120 may perform the uplink transmission on the beam B1 using a transmit power that was configured for the beam B1. In some aspects, the UE 120 may reallocate the transmit power from the beam B2 to the beam B1 based at least in part on determining that the channel access procedure for the beam B2 failed. In this case, the UE 120 may perform the uplink transmission on the beam B1 using the combined transmit power configured for the beam B1 and the transmit power reallocated from the beam B2. Moreover, the UE 120 may modify or adjust the modulation, the channel coding, or other transmit parameters of the uplink transmission in order to take advantage of the combined transmit power configured for the beam B1 and the transmit power reallocated from the beam B2. The UE 120 may transmit an indication of the modified or adjusted modulation, the modified or adjusted channel coding, or other modified or adjusted transmit parameters to the base station 110.

In some aspects, performing the uplink transmission on the subset of the beams B1 and B2 may cause demodulation or decoding difficulties at the base station 110. For example, the UE 120 may perform a channel transport process for the uplink transmission under the assumption that the uplink transmission will be performed on the beams B1 and B2. In this case, the UE 120 may channel code the systematic bits of the uplink transmission to add parity bits to the systematic bits, may rate match the systematic bits and parity bits, or may perform other channel transport processing techniques. The UE 120 may map the channel coded and rate matched bits of the uplink transmission to the beams B1 and B2 in the spatial domain, the frequency domain, and the time domain.

Moreover, during the channel transport process, the UE 120 may determine a transport block size for the uplink transmission based at least in part on which of the beams B1 and B2 the channel access procedure was determined to be successful (for example, the beam B1), based at least in part on a quantity of the beams for which the channel access procedure was determined to be successful, or other parameters associated with the channel access procedure of the beams B1 and B2.

However, if the UE 120 performs the uplink transmission on the beam B1 and not the beam B2, the mapping order described above may cause the uplink transmission on the beam B1 to include an insufficient quantity of systematic bits for the base station 110 to perform error correction to recover the systematic bits that were to be transmitted on the beam B2. Accordingly, in some aspects, the UE 120 may modify the mapping order for the channel coded and rate matched bits of the uplink transmission based at least in part on determining to perform the uplink transmission on beam B1 and not on the beam B2. In this case, the UE 120 may map the channel coded and rate matched bits of the uplink transmission in the frequency domain first, the time domain second, and the spatial domain third. This permits the UE 120 to map a greater quantity of systematic bits to the beam B1, which permits the base station 110 to recover a greater quantity of systematic bits of the uplink transmission.

In some aspects, the base station 110 may determine that the UE 120 performed the uplink transmission on a subset of the beams B1 and B2 based at least in part on detecting DMRSs transmitted from the UE 120. For example, the UE 120 may transmit a DMRS for each beam on which the UE 120 performs the uplink transmission, to facilitate demodulation and decoding of the uplink transmission at the base station 110. Here, the UE 120 may transmit a DMRS on the beam B1 and not on the beam B2 because the UE 120 performed the uplink transmission on the beam B1 and refrained from performing the uplink transmission on the beam B2.

The base station 110 may detect the DMRS on the beam B1, may determine that a DMRS is not detected on the beam B2, and therefore may determine that the UE 120 did not perform the uplink transmission on the beam B2. Accordingly, the base station 110 may receive the uplink transmission on the beam B1 and may demodulate and decode the uplink transmission based at least in part on determining that the UE 120 performed the uplink transmission on the beam B1 and not on the beam B2.

In some aspects, the base station 110 may schedule a retransmission of a remaining portion of the uplink transmission (for example, the portion of the uplink transmission that was scheduled to be performed on the beam B2) on the beam B2 based at least in part on determining that the UE 120 performed a portion of the uplink transmission on the beam B1. The base station 110 may schedule the retransmission by transmitting a retransmission request to the UE 120. As indicated above, in some aspects, the base station 110 may detect the beams on which the UE 120 performed the uplink transmission based at least in part on detecting a DMRS transmission on the beams. In some aspects, the UE 120 may transmit uplink control information (UCI) to the base station 110 (for example, as part of the uplink transmission or in another concurrent or subsequent uplink transmission) that identifies the beams on which the UE 120 performed the uplink transmission.

In some aspects, the UE 120 may maintain an existing power headroom report (PHR) of the UE 120, or may transmit an updated PHR to the base station 110 prior to, concurrently with, or after performing the uplink transmission. The updated PHR may indicate a power headroom of the UE 120 based at least in part on determining to perform the uplink transmission on the beam B1 and not the beam B2. In some aspects, the UE 120 may determine to transmit the updated PHR based at least in part on determining that a time buffer, between performing the channel access procedure for the beams B1 and B2 and performing the uplink transmission, satisfies a threshold amount of time (for example, >10 µs or within a range of 10 to several hundreds of µs).

In some aspects, the UE 120 may transmit sounding reference signals (SRSs) on each of the beams B1 and B2. For example, the UE 120 may sequentially cycle through SRS transmission on the beams B1 and B2. However, if the UE 120 determines that the channel access procedure for the beam B2 failed, the UE 120 may be unable to perform a scheduled SRS transmission on the beam B2. In this case, the UE 120 may refrain from transmitting the scheduled SRS on the beam B2 (in which case, the symbol may remain empty), or may attempt to modify or adjust an order of SRS transmissions on the beams B1 and B2 such that the UE 120 may transmit the SRS transmission on the beam B1 when the beam B2 is busy or in use.

Figure 6:
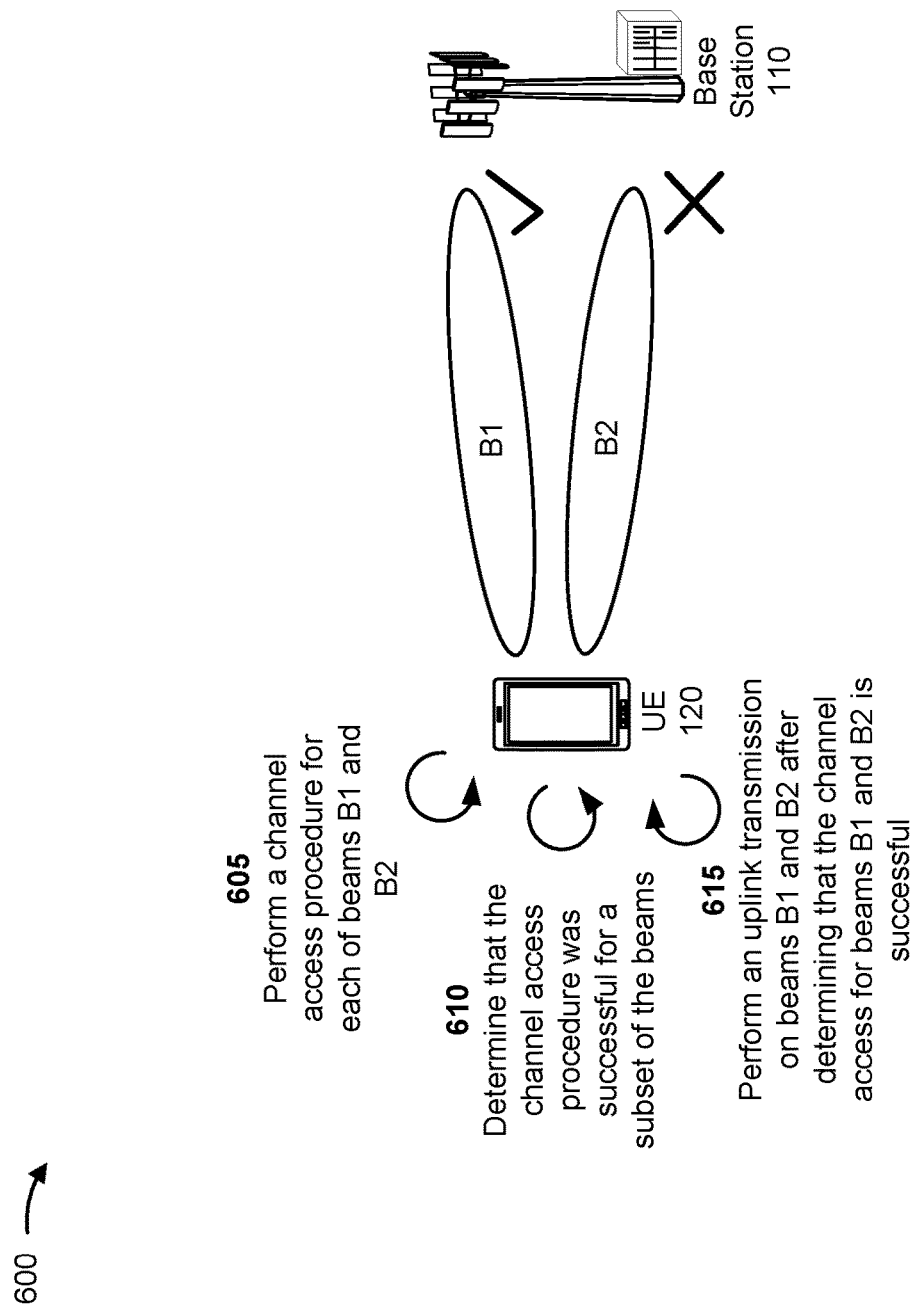

FIG. 6 is a diagram illustrating an example 600 in which a UE 120 and a base station 110 perform techniques associated with beam-based channel access procedures for a plurality of beams (for example, beams B1 and B2) on which the UE 120 is scheduled to perform an uplink transmission to the base station 110. In some aspects, the UE 120 may be scheduled to perform the uplink transmission by dynamic scheduling (for example, DCI scheduling), by semi-persistent scheduling (for example, RRC scheduling or MAC-CE scheduling), cross-TxOP scheduling, or other forms of uplink scheduling.

In some aspects, the UE 120 may perform techniques associated with beam-based channel access procedures, described in connection with FIG. 6, for a greater quantity of beams, for a greater quantity of base stations 110, or for a different configuration of beams. As an example, while FIG. 6 illustrates the UE 120 being scheduled to perform an uplink transmission to base station 110 on two beams, UE 120 may be scheduled to perform the uplink transmission to a base station 110 on a greater quantity of beams, may be scheduled to perform the uplink transmission to a greater quantity of base stations 110 (a multi-TRP transmission), or may be scheduled to perform the uplink transmission to a greater quantity of base stations 110 and on a greater quantity of beams.

As shown by reference number 605 in FIG. 6, in some aspects, the UE 120 may perform a channel access procedure for each of the beams B1 and B2 prior to performing the uplink transmission. The UE 120 may perform a channel access procedure for a beam to determine whether the beam is available to be used for the uplink transmission.

In some aspects, the UE 120 may perform a channel access procedure for a beam by sensing the uplink channel (for example, a PUSCH or PUCCH), on which the UE 120 is to perform the uplink transmission, in the spatial direction of the beam. In this case, if the UE 120 determines that the uplink channel is busy or in use in the spatial direction of the beam, the UE 120 may determine that the channel access procedure for the beam is unsuccessful or failed. Conversely, if the UE 120 determines that the uplink channel is idle or not in use in the spatial direction of the beam, the UE 120 may determine that the channel access procedure for the beam is successful.

As shown by reference number 610, the UE 120 may determine that the channel access procedure was successful for a subset of the beams B1 and B2, and may determine that the channel access procedure failed for another subset of the beams B1 and B2. For example, the UE 120 may determine that the channel access procedure was successful for the beam B1, and may determine that the channel access procedure failed for the beam B2.

The UE 120 may determine that the channel access procedure was successful for the beam B1 based at least in part on determining that the uplink channel, on which the UE 120 is to perform the uplink transmission, is idle or not in use in the spatial direction of the beam B1. Moreover, the UE 120 may determine that the channel access procedure failed for the beam B2 based at least in part on determining that the uplink channel, on which the UE 120 is to perform the uplink transmission, is busy or in use in the spatial direction of the beam B2.

As shown by reference number 615, the UE 120 may perform the uplink transmission on the beams B1 and B2 after determining that the channel access procedure for all of the beams B1 and B2 is successful. In this case, the UE 120 may determine to refrain from performing the uplink transmission on the beams B1 and B2 and may delay the uplink transmission until the UE 120 determines that the channel access procedure for all of the beams B1 and B2 is successful. In some aspects, the UE 120 may subsequently perform the uplink transmission on the beams B1 and B2 once the UE 120 determines that the channel access procedure for all of the beams B1 and B2 is successful.

FIG. 7 is a diagram illustrating an example process 700 performed, for example, by a BS. The example process 700 shows where a base station (for example, base station 110) performs operations associated with beam-based channel access procedures.

As shown in FIG. 7, in some aspects, the process 700 may include performing a channel access procedure for a plurality of beams (block 710). For example, the base station (such as by using transmit processor 220, receive processor 238, controller/processor 240, memory 242) may perform a channel access procedure for a plurality of beams. In some aspects, a processing system of the base station may be configured to execute the channel access procedure for the plurality of beams.

As shown in FIG. 7, in some aspects, the process 700 may include determining that the channel access procedure was successful for a subset of beams of the plurality of beams (block 720). For example, the base station (such as, using transmit processor 220, receive processor 238, controller/processor 240, memory 242) may determine that the channel access procedure was successful for a subset of beams of the plurality of beams. In some aspects, the processing system of the base station may be configured to determine that the channel access procedure was successful for the subset of beams of the plurality of beams.

As further shown in FIG. 7, in some aspects, the process 700 may include performing a downlink transmission on the subset of beams based at least in part on determining that the channel access procedure was successful for the subset of beams (block 730). For example, the base station (such as, using transmit processor 220, receive processor 238, controller/processor 240, memory 242) may perform a downlink transmission on the subset of beams based at least in part on determining that the channel access procedure was successful for the subset of beams. In some aspects, an interface of the base station may be configured to output a downlink signal for transmission on the subset of beams based at least in part on determining that the channel access procedure was successful for the subset of beams.

The process 700 may include additional aspects, such as any single aspect or any combination of aspects described below or in connection with one or more other processes described elsewhere herein.

In a first aspect, performing the downlink transmission may include mapping the downlink transmission to the subset of beams in a frequency domain; mapping the downlink transmission to the subset of beams in a time domain after mapping the downlink transmission in the frequency domain; mapping the downlink transmission to the subset of beams in a spatial domain after mapping the downlink transmission in the time domain; and performing the downlink transmission on the subset of beams based at least in part on mapping the downlink transmission to the subset of beams in the frequency domain, the time domain, and the spatial domain.

In a second aspect, alone or in combination with the first aspect, performing the downlink transmission may include determining a transport block size for the downlink transmission based on a quantity of the plurality of beams. In a third aspect, alone or in combination with one or more of the first or second aspects, performing the downlink transmission may include determining a transport block size for the downlink transmission based on which of the plurality of beams that the channel access procedure was determined to be successful.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

FIG. 8 is a diagram illustrating an example process 800 performed, for example, by a BS. The example process 800 shows where a base station (for example, base station 110) performs operations associated with beam-based channel access procedures.

As shown in FIG. 8, in some aspects, the process 800 may include performing a channel access procedure for a plurality of beams (block 810). For example, the base station (such as, using transmit processor 220, receive processor 238, controller/processor 240, memory 242) may perform a channel access procedure for a plurality of beams. In some aspects, a processing system of the base station may be configured to execute the channel access procedure for the plurality of beams.

As shown in FIG. 8, in some aspects, the process 800 may include determining that the channel access procedure was successful for a subset of beams of the plurality of beams (block 820). For example, the base station (such as, using transmit processor 220, receive processor 238, controller/processor 240, memory 242) may determine that the channel access procedure was successful for a subset of beams of the plurality of beams. In some aspects, the processing system of the base station may be configured to determine that the channel access procedure was successful for a subset of beams of the plurality of beams.

As further shown in FIG. 8, in some aspects, the process 800 may include performing a downlink transmission on the plurality of beams after determining that the channel access procedure for the plurality of beams is successful (block 830). For example, the base station (such as, using transmit processor 220, receive processor 238, controller/processor 240, memory 242) may perform a downlink transmission on the plurality of beams after determining that the channel access procedure for the plurality of beams is successful. In some aspects, an interface of the base station may be configured to output a downlink signal for transmission on the plurality of beams after determining that the channel access procedure for the plurality of beams is successful.

The process 800 may include additional aspects, such as any single aspect or any combination of aspects described below or in connection with one or more other processes described elsewhere herein.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

FIG. 9 is a diagram illustrating an example process 900 performed, for example, by a UE. The example process 900 shows where a base station (for example, UE 110) performs operations associated with beam-based channel access procedures.

As shown in FIG. 9, in some aspects, the process 900 may include performing a channel access procedure for a plurality of beams (block 910). For example, the UE (such as, using transmit processor 264, receive processor 258, controller/processor 280, memory 282) may perform a channel access procedure for a plurality of beams. In some aspects, a processing system of the UE may be configured to execute the channel access procedure for the plurality of beams.

As shown in FIG. 9, in some aspects, the process 900 may include determining that the channel access procedure was successful for a subset of beams of the plurality of beams (block 920). For example, the UE (such as, using transmit processor 264, receive processor 258, controller/processor 280, memory 282) may determine that the channel access procedure was successful for a subset of beams of the plurality of beams. In some aspects, the processing system of the UE may be configured to determine that the channel access procedure was successful for a subset of beams of the plurality of beams.

As further shown in FIG. 9, in some aspects, the process 900 may include performing an uplink transmission on the subset of beams based at least in part on determining that the channel access procedure was successful for the subset of beams (block 930). For example, the UE (such as, using transmit processor 264, receive processor 258, controller/processor 280, memory 282) may perform an uplink transmission on the subset of beams based at least in part on determining that the channel access procedure was successful for the subset of beams. In some aspects, an interface of the UE may be configured to output an uplink signal for transmission on the subset of beams based at least in part on determining that the channel access procedure was successful for the subset of beams.

The process 900 may include additional aspects, such as any single aspect or any combination of aspects described below or in connection with one or more other processes described elsewhere herein.

In a first aspect, performing the uplink transmission includes mapping the uplink transmission to the subset of beams in a frequency domain; mapping the uplink transmission to the subset of beams in a time domain after mapping the uplink transmission in the frequency domain; mapping the uplink transmission to the subset of beams in a spatial domain after mapping the uplink transmission in the time domain; and performing the uplink transmission on the subset of beams based at least in part on mapping the uplink transmission to the subset of beams in the frequency domain, the time domain, and the spatial domain. In a second aspect, alone or in combination with the first aspect, process 900 further includes transmitting, to a BS, an indication of the subset of beams; receiving, from the BS and based at least in part on transmitting the indication of the subset of beams, a retransmission request to retransmit the uplink transmission on another subset of beams of the plurality of beams; and performing, based at least in part on receiving the retransmission request, a retransmission of the uplink transmission on the other subset of beams.

In a third aspect, alone or in combination with one or more of the first and second aspects, transmitting the indication of the subset of beams includes transmitting the indication of the subset of beams in uplink control information. In a fourth aspect, alone or in combination with one or more of the first through third aspects, performing the uplink transmission includes reallocating transmit power from another subset of beams, of the plurality of beams, to the subset of beams; and performing the uplink transmission based at least in part on transmit power of the subset of beams and the transmit power reallocated from the other subset of beams to the subset of beams.

In a fifth aspect, alone or in combination with one or more of the first through fourth aspects, performing the uplink transmission includes at least one of adjusting modulation of the uplink transmission based at least in part on reallocating the transmit power from the other subset of beams to the subset of beams, or adjusting channel coding of the uplink transmission based at least in part on reallocating the transmit power from the other subset of beams to the subset of beams. In a sixth aspect, alone or in combination with one or more of the first through fifth aspects, process 900 further includes transmitting an indication of at least one of the adjusted modulation, the adjusted channel coding, or a power headroom report that is based at least in part on the transmit power of the subset of beams and the transmit power reallocated from the other subset of beams to the subset of beams. In a seventh aspect, alone or in combination with one or more of the first through sixth aspects, process 900 further includes adjusting a sounding reference signal transmission order on the plurality of beams based at least in part on determining that the respective channel access procedures were not successful.

In an eighth aspect, alone or in combination with one or more of the first through seventh aspects, performing the uplink transmission may include determining a transport block size for the uplink transmission based on a quantity of the plurality of beams. In a ninth aspect, alone or in combination with one or more of the first through eighth aspects, performing the uplink transmission may include determining a transport block size for the uplink transmission based on which of the plurality of beams that the channel access procedure was determined to be successful.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

FIG. 10 is a diagram illustrating an example process 1000 performed, for example, by a UE. The example process 1000 shows where a base station (for example, base station 110) performs operations associated with beam-based channel access procedures.

As shown in FIG. 10, in some aspects, the process 1000 may include performing a channel access procedure for a plurality of beams (block 1010). For example, the UE (such as, using transmit processor 264, receive processor 258, controller/processor 280, memory 282) may perform a channel access procedure for a plurality of beams. In some aspects, a processing system of the UE may be configured to execute the channel access procedure for the plurality of beams.

As shown in FIG. 10, in some aspects, the process 1000 may include determining that the channel access procedure was successful for a subset of beams of the plurality of beams (block 1020). For example, the UE (such as, using transmit processor 264, receive processor 258, controller/processor 280, memory 282) may determine that the channel access procedure was successful for a subset of beams of the plurality of beams. In some aspects, the processing system of the UE may be configured to determine that the channel access procedure was successful for a subset of beams of the plurality of beams.

As further shown in FIG. 10, in some aspects, the process 1000 may include performing an uplink transmission on the plurality of beams after determining that the channel access procedure for the plurality of beams is successful (block 1030). For example, the UE (such as, using transmit processor 264, receive processor 258, controller/processor 280, memory 282) may perform an uplink transmission on the plurality of beams after determining that the channel access procedure for the plurality of beams is successful. In some aspects, an interface of the of the UE may be configured to output a signal for uplink transmission on the plurality of beams.

The process 1000 may include additional aspects, such as any single aspect or any combination of aspects described below or in connection with one or more other processes described elsewhere herein.

Although FIG. 10 shows example blocks of the process 1000, in some aspects, the process 1000 may include additional blocks, fewer blocks, different blocks, or differently arranged blocks than those depicted in FIG. 8. Additionally, or alternatively, two or more of the blocks of the process 800 may be performed in parallel.

Figure 11:
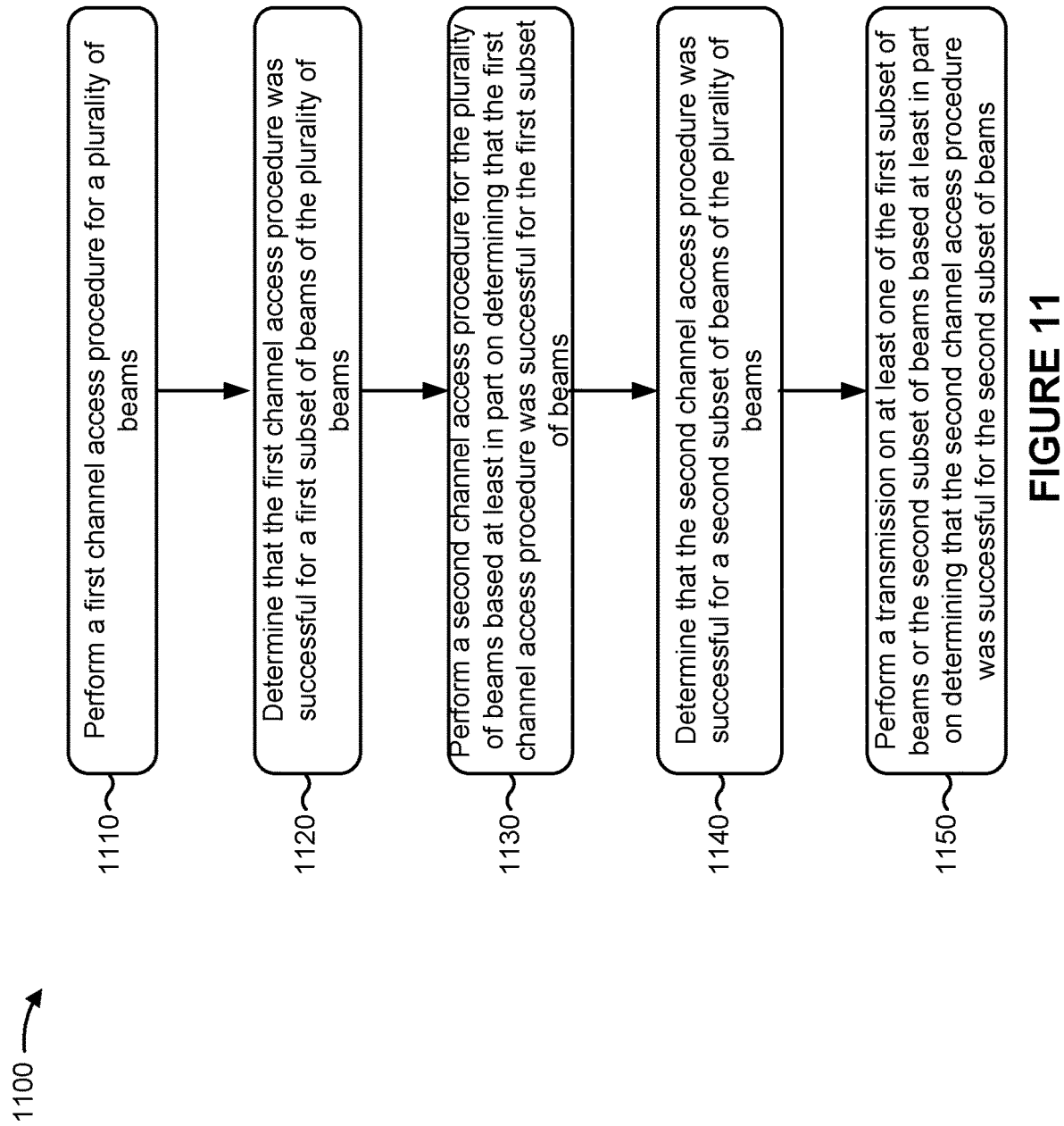
FIG. 11 is a diagram illustrating example process performed, for example, by a wireless communication device.

FIG. 11 is a diagram illustrating an example process 1100 performed, for example, by a wireless communication device. The process 1100 is an example where the wireless communication device (for example, the UE 120 or the BS 110, among other examples) performs operations associated with beam-based channel access procedures.

As shown in FIG. 11, in some aspects, the process 1100 may include performing a first channel access procedure for a plurality of beams (block 1110). For example, the wireless communication device (such as, using transmit processor 220, receive processor 238, controller/processor 240, memory 242, transmit processor 264, receive processor 258, controller/processor 280, memory 282, or another component) may perform a first channel access procedure for a plurality of beams, as described above. In some aspects, a processing system of the wireless communication device may be configured to execute a first channel access procedure for a plurality of beams.

As shown in FIG. 11, in some aspects, the process 1100 may include determining that the first channel access procedure was successful for a first subset of beams of the plurality of beams (block 1120). For example, the wireless communication device (such as, using transmit processor 220, receive processor 238, controller/processor 240, memory 242, transmit processor 264, receive processor 258, controller/processor 280, memory 282, or another component) may determine that the first channel access procedure was successful for a first subset of beams of the plurality of beams, as described above. In some aspects, the processing system of the wireless communication device may be configured to determine that the first channel access procedure was successful for a first subset of beams of the plurality of beams.

As shown in FIG. 11, in some aspects, the process 1100 may include performing a second channel access procedure for the plurality of beams based at least in part on determining that the first channel access procedure was successful for the first subset of beams (block 1130). For example, the wireless communication device (such as, using transmit processor 220, receive processor 238, controller/processor 240, memory 242, transmit processor 264, receive processor 258, controller/processor 280, memory 282, or another component) may perform a second channel access procedure for the plurality of beams based at least in part on determining that the first channel access procedure was successful for the first subset of beams, as described above. In some aspects, the processing system of the wireless communication device may be configured to execute a second channel access procedure for the plurality of beams based at least in part on determining that the first channel access procedure was successful for the first subset of beams.

As shown in FIG. 11, in some aspects, the process 1100 may include determining that the second channel access procedure was successful for a second subset of beams of the plurality of beams (block 1140). For example, the wireless communication device (such as, using transmit processor 220, receive processor 238, controller/processor 240, memory 242, transmit processor 264, receive processor 258, controller/processor 280, memory 282, or another component) may determine that the second channel access procedure was successful for a second subset of beams of the plurality of beams, as described above. In some aspects, the processing system of the wireless communication device may be configured to determine that the second channel access procedure was successful for a second subset of beams of the plurality of beams.

As shown in FIG. 11, in some aspects, the process 1100 may include performing a transmission on at least one of the first subset of beams or the second subset of beams based at least in part on determining that the second channel access procedure was successful for the second subset of beams (block 1150). For example, the wireless communication device (such as, using transmit processor 220, receive processor 238, controller/processor 240, memory 242, transmit processor 264, receive processor 258, controller/processor 280, memory 282, or another component) may perform a transmission on at least one of the first subset of beams or the second subset of beams based at least in part on determining that the second channel access procedure was successful for the second subset of beams, as described above. In some aspects, an interface of the wireless communication device may be configured to output a signal for transmission on at least one of the first subset of beams or the second subset of beams based at least in part on determining that the second channel access procedure was successful for the second subset of beams.

The process 1100 may include additional aspects, such as any single aspect or any combination of aspects described below or in connection with one or more other processes described elsewhere herein.

In a first aspect, the wireless communication device is a base station or a user equipment. In a second additional aspect, alone or in combination with the first aspect, the wireless communication device is a user equipment, and performing the second channel access procedure for the plurality of beams includes performing the second channel access procedure for the plurality of beams based at least in part on receiving, from a base station, an indication to perform the second channel access procedure if the first channel access procedure is successful for the first subset of beams.

Although FIG. 11 shows example blocks of the process 1100, in some aspects, the process 1100 may include additional blocks, fewer blocks, different blocks, or differently arranged blocks than those depicted in FIG. 11. Additionally, or alternatively, two or more of the blocks of the process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed at a wireless communication device, comprising:
   performing a channel access procedure fora plurality of beams;
   mapping a transmission to a successful subset of the plurality of beams for which the channel access procedure was successfully performed;
   reallocating transmit power from a different subset of the plurality of beams to the successful subset of the plurality of beams;
   adjusting modulation of the transmission based at least in part on reallocating the transmit power from the different subset of the plurality of beams to the successful subset of the plurality of beams, wherein the channel access procedure was successfully performed for the successful subset of the plurality of beams based on a channel being idle or not in use in a spatial direction of the successful subset of the plurality of beams; and
   performing the transmission on the successful subset of the plurality of beams,
      wherein performing the transmission comprises:
         transmitting a demodulation reference signal (DMRS) on a first beam, of the successful subset of the plurality of beams, while the DMRS is not transmitted on a second beam that is different from the successful subset of the plurality of beams.

2. The method of claim 1,
   wherein the wireless communication device is a base station;
   wherein the transmission is a downlink transmission; and
   wherein mapping the transmission comprises:
      mapping the downlink transmission to the successful subset of the plurality of beams in a frequency domain.

3. The method of claim 1, wherein the wireless communication device is a user equipment;
   wherein the transmission is an uplink transmission; and
   wherein mapping the transmission comprises:
      mapping the uplink transmission to the successful subset of the plurality of beams in a frequency domain.

4. The method of claim 1,
   wherein the transmission is performed based on a transport block size for the transmission, and
   wherein the transport block size is based on a quantity of the plurality of beams.

5. The method of claim 1,
   wherein the transmission is performed based on a transport block size for the transmission, and
   wherein the transport block size is based on the successful subset of the plurality of beams.

6. The method of claim 1, wherein the wireless communication device is a user equipment; and
   wherein the method further comprises:
      transmitting, to a base station (BS), an indication of the successful subset of the plurality of beams;
      receiving, from the BS and based at least in part on transmitting the indication of the successful subset of the plurality of beams, a retransmission request to retransmit the transmission on the different subset of the plurality of beams; and
      performing, based at least in part on receiving the retransmission request, a retransmission of the transmission on the different subset of the plurality of beams.

7. The method of claim 6, wherein transmitting the indication of the successful subset of the plurality of beams comprises:
   transmitting the indication of the successful subset of the plurality of beams in uplink control information (UCI).

8. The method of claim 1, wherein the transmission is performed based at least in part on transmit power of the successful subset of the plurality of beams and the transmit power reallocated from the different subset of the plurality of beams to the successful subset of the plurality of beams.

9. The method of claim 1, further comprising:
   adjusting channel coding of the transmission based at least in part on reallocating the transmit power from the different subset of the plurality of beams to the successful subset of the plurality of beams.

10. The method of claim 9, further comprising:
    transmitting an indication of at least one of:
       the adjusted modulation,
       the adjusted channel coding, or
       a power headroom report that is based at least in part on the transmit power of the successful subset of the plurality of beams and the transmit power reallocated from the different subset of the plurality of beams to the successful subset of the plurality of beams.

11. The method of claim 1, wherein the wireless communication device is a user equipment; and
    wherein the method further comprises:
       adjusting a sounding reference signal (SRS) transmission order on the plurality of beams based at least in part on respective channel access procedures that were not successfully performed.

12. A method of wireless communication performed at a user equipment, comprising:
    receiving an indication to perform a second channel access procedure if a first channel access procedure is successful for a first subset of beams of a plurality of beams;
    performing the first channel access procedure for the plurality of beams;
    performing the second channel access procedure for the plurality of beams based on the indication and based on the first channel access procedure being successful for the first subset of beams; and performing a transmission on at least one of the first subset of beams or a second subset of beams based at least in part on the second channel access procedure being successful for the second subset of beams,
wherein performing the transmission comprises:
transmitting a demodulation reference signal (DMRS) on a first beam, of the first subset of beams or the second subset of beams, while the DMRS is not transmitted on a second beam that is different from the first subset of beams and the second subset of beams.

13. The method of claim 12, wherein receiving the indication comprises:
receiving, from a base station, the indication.

14. An apparatus for wireless communication, comprising:
a processing system configured to:
execute a channel access procedure for a plurality of beams;
map a transmission to a successful subset of the plurality of beams for which the channel access procedure was successfully performed;
reallocate transmit power from a different subset of the plurality of beams to the successful subset of the plurality of beams; and
adjust modulation of the transmission based at least in part on reallocating the transmit power from the different subset of the plurality of beams to the successful subset of the plurality of beams, wherein the channel access procedure was successfully performed for the successful subset of the plurality of beams based on a channel being idle or not in use in a spatial direction of the successful subset of the plurality of beams; and
an interface configured to:
output a demodulation reference signal (DMRS) for the transmission on a first beam, of the successful subset of the plurality of beams, while the DMRS is not transmitted on a second beam that is different from the successful subset of the plurality of beams.

15. The apparatus of claim 14, further comprising a transmitter configured to transmit the DMRS, wherein:
the DMRS is a downlink signal,
the processing system, when mapping the transmission, is configured to map the transmission to the successful subset of the plurality of beams in a frequency domain, and
the apparatus is configured as a base station.

16. The apparatus of claim 14, further comprising a transmitter configured to transmit the DMRS, wherein:
the DMRS is an uplink signal,
the processing system, to map the transmission, is configured to map the transmission to the successful subset of the plurality of beams in a frequency domain, and
the apparatus is configured as a user equipment.

17. The apparatus of claim 14,
wherein the processing system is further configured to:
determine a transport block size for the transmission based on a quantity of the plurality of beams, and
wherein the DMRS is outputted for the transmission based on the transport block size.

18. The apparatus of claim 14,
wherein the processing system is further configured to:
determine a transport block size for the transmission based on the successful subset of the plurality of beams, and
wherein the DMRS is outputted for the transmission based on the transport block size.

19. The apparatus of claim 14, further comprising a transceiver configured to transmit the DMRS, wherein:
the transceiver is configured to:
transmit, to a base station (BS), an indication of the successful subset of the plurality of beams; and
receive, from the BS and based at least in part on transmitting the indication of the successful subset of the plurality of beams, a retransmission request to retransmit the DMRS on the different subset of the plurality of beams,
the processing system is configured to:
perform, based at least in part on receiving the retransmission request, a retransmission of the transmission on the different subset of the plurality of beams, and
the apparatus is configured as a user equipment.

20. The apparatus of claim 19, wherein the indication of the successful subset of the plurality of beams is transmitted via uplink control information (UCI).

21. The apparatus of claim 14, wherein, when to output the DMRS, the interface is configured to:
output the DMRS based at least in part on transmit power of the successful subset of the plurality of beams and the transmit power reallocated from the different subset of the plurality of beams to the successful subset of the plurality of beams.

22. The apparatus of claim 14, wherein the processing system is further configured to:
adjust channel coding of the DMRS based at least in part on reallocating the transmit power from the different subset of the plurality of beams to the successful subset of the plurality of beams.

23. The apparatus of claim 22, wherein the interface is further configured to:
output an indication of at least one of:
the adjusted modulation,
the adjusted channel coding, or
a power headroom report that is based at least in part on the transmit power of the successful subset of the plurality of beams and the transmit power reallocated from the different subset of the plurality of beams to the successful subset of the plurality of beams.

24. The apparatus of claim 14, wherein the apparatus is a user equipment; and
wherein the processing system is further configured to:
adjust a sounding reference signal transmission order on the plurality of beams based at least in part on respective channel access procedures that were not successfully performed.

25. A user equipment, comprising:
a transceiver configured to:
receive an indication to perform a second channel access procedure if a first channel access procedure is successful for a first subset of beams of a plurality of beams; and
a processing system configured to:
execute the first channel access procedure for the plurality of beams; and
execute the second channel access procedure for the plurality of beams based on the indication and based on the first channel access procedure being successful for the first subset of beams,
the transceiver being further configured to:
transmit a demodulation reference signal (DMRS) on a first beam, of at least one of the first subset of beams or a second subset of beams of the plurality of beams, based at least in part on the second channel access procedure being successful for the second subset of beams and while the DMRS is not transmitted on a second beam that is different from the first subset of beams and the second subset of beams.

26. The user equipment of claim 25, wherein the indication is from a base station.

27. The method of claim 1,
wherein the spatial direction of the successful subset of the plurality of beams is a spatial direction of the first beam,
wherein performing the channel access procedure for the plurality of beams comprises:
determining that an uplink channel is not in use in the spatial direction of the first beam, wherein:
the channel access procedure for the first beam is successful based on determining that the uplink channel is not in use in the spatial direction of the first beam.

28. The method of claim 1, wherein performing the channel access procedure for the plurality of beams comprises:
determining that an uplink channel is busy or in use in a spatial direction of the second beam, wherein:
the channel access procedure for the second beam is unsuccessful based on determining that the uplink channel is busy or in use in the spatial direction of the second beam.

29. The apparatus of claim 14,
wherein the spatial direction of the successful subset of the plurality of beams is a spatial direction of the first beam,
wherein, to execute the channel access procedure for the plurality of beams, the processing system is configured to:
determine that an uplink channel is not in use in the spatial direction of the first beam, wherein:
the channel access procedure for the first beam is successful based on determining that the uplink channel is not in use in the spatial direction of the first beam.

30. The apparatus of claim 14, wherein, to execute the channel access procedure for the plurality of beams, the processing system is configured to:
determine that an uplink channel is busy or in use in a spatial direction of the second beam, wherein:
the channel access procedure for the second beam is unsuccessful based on determining that the uplink channel is busy or in use in the spatial direction of the second beam.

31. The apparatus of claim 14,
wherein, to execute the channel access procedure, the processing system is configured to:
execute the channel access procedure for the first beam, and
execute the channel access procedure for the second beam, and
wherein the different subset of the plurality of beams comprises the second beam.

* * * * *